(12) United States Patent
Tsunoda

(10) Patent No.: US 6,406,261 B1
(45) Date of Patent: Jun. 18, 2002

(54) COUNTER PROPELLER PROPULSION UNIT

(76) Inventor: Kazuo Tsunoda, 192, Ho, Youkaichiba-shi, Chiba-ken, 289-2146 (JP)

(*) Notice: Subject to any disclaimer, the term of this patent is extended or adjusted under 35 U.S.C. 154(b) by 0 days.

(21) Appl. No.: 09/647,807

(22) PCT Filed: Apr. 5, 1999

(86) PCT No.: PCT/JP99/01797

§ 371 (c)(1),
(2), (4) Date: Oct. 5, 2000

(87) PCT Pub. No.: WO99/51493

PCT Pub. Date: Oct. 14, 1999

(30) Foreign Application Priority Data

Apr. 6, 1998 (JP) ............................................ 10-108424

(51) Int. Cl.7 ................................................ F04F 1/06
(52) U.S. Cl. .................. 416/126; 416/129; 416/170 R; 415/124.2
(58) Field of Search .............................. 416/129, 122.3, 416/126, 128, 170 R, 198 R, 125; 415/124.1, 124.2, 124

(56) References Cited

U.S. PATENT DOCUMENTS 1,110,489 A * 9/1914 Jacobs ........................ 416/125
3,411,737 A 11/1968 Godwin
4,997,414 A * 3/1991 Camara et al. ............. 475/330

FOREIGN PATENT DOCUMENTS

| DE | 32 39 020 | 4/1984 |
| FR | 2 620 106 | 3/1989 |
| JP | 56-118200 | 9/1981 |
| JP | 57-17900 | 1/1982 |

* cited by examiner

Primary Examiner—Edward K. Look
Assistant Examiner—James M McAleenan
(74) Attorney, Agent, or Firm—Wenderoth, Lind & Ponack, L.L.P.

(57) ABSTRACT

A propeller propulsion unit comprising a prime mover, propellers, and rotating force transmission for transmitting the rotating force of the prime mover to the propellers, wherein a counter propeller is fixed to a main shaft and a forward propeller is mounted to be rotatable on the main shaft, and these propellers are rotated in the directions reverse to each other by a belt transmission mechanism having forward and reverse running belts, whereby a lightweight moving body susceptible to an effect by a torque reaction can be steered stably.

12 Claims, 5 Drawing Sheets

COUNTER PROPELLER PROPULSION UNIT

DESCRIPTION

1. Technical Field

The present invention relates to a counter propeller propulsion unit for use in a relatively lightweight moving body such as a light plane, a motor hang glider, a motor paraglider, a paraplane, a Hovercraft, a lightweight helicopter and the like.

2. Background Art

For typical propeller propulsion aircraft, single row propellers arranged on a single rotational plane have heretofore been employed. The single row propeller produces torque by which the airframe tends to turn in a direction opposite to the direction in which the propeller rotates because of the reaction of the torque produced by the rotation of the propeller. So, counter propellers came onstage in order to stabilize the steering of the airframe by neutralizing the torque of the propellers.

As disclosed in JP-B-7-112834 and JP-A-8-156894, for example, gears have been used for conventional counter propellers in transmission mechanisms for transmitting rotating force of engines and propellers.

Such a counter propeller mechanism conventionally using gears has been developed for comparatively large-sized airframe and the mechanism is not only complicated in structure but also extremely heavy. Consequently, it has been difficult to use the counter propeller mechanism in any lightweight moving body mentioned above. Furthermore, because the gears are contained in a box, there exist problems arising from difficulties in troubleshooting and predicting trouble for ensuring safety, and inconvenience in view of doing maintenance.

DISCLOSURE OF THE INVENTION

An object of the present invention made to solve the foregoing problems is to provide a lightweight, highly safe counter propeller propulsion unit which is extremely simple in structure and particularly capable of securing stable steering when loaded in a lightweight moving body susceptible to an effect by a torque reaction. The propeller propulsion unit of the present invention is free from the use of a conventional gear actuating lubricant, as well as being easy to solely repair and replace parts for troubleshooting purposes. The propulsion unit also enables easy maintenance so as to predict any trouble.

In order to solve the foregoing problems, the counter propeller propulsion unit according to the invention comprises a prime mover, propellers, and a rotating force transmission means for transmitting the rotating force of the prime mover to the propellers, wherein a counter propeller is fixed to a main shaft and a forward propeller is pivoted rotatably on the main shaft, and these propellers are rotated in the directions reverse to each other by a belt transmission mechanism having forward and reverse running belts. The rotating force transmission means includes a power pulley secured to the driving shaft of the prime mover, a forward pulley secured to the forward propeller pivoted rotatably on the main shaft, a reverse pulley secured to the main shaft, a forward running belt for interlocking the reverse pulley with a tension pulley. The terms 'forward' and 'reverse' used in this description mean the relative relation of directions of rotation depending on the direction of rotation of the propeller.

To solve the foregoing problems, the counter propeller propulsion unit according to the invention is characterized in that in its rotating force transmission means, the belt transmission mechanism includes switching the power and tension pulleys, the forward running belt for interlocking the forward pulley with the tension pulley, the reverse running belt for interlocking the reverse pulley with the power pulley, and the belt transmission mechanism for interlocking one of the belts supported between both the pulleys of the reverse running belt with the tension pulley from the outside whereby to rotate the propellers in the directions reverse to each other.

To solve the foregoing problems, it is preferred for the counter propeller propulsion unit according to the invention to have the face of the forward and/or reverse running belt in contact with at least each pulley having a plurality of substantially inverted-V ribs in the longer direction and for the surface of the pulley in contact with the belt to have substantially sectionally V-shaped grooves engaging with the respective ribs in the circumferential direction.

To solve the foregoing problems, moreover, the counter propeller propulsion unit according to the invention is characterized in that in its rotating force transmission means, chains in place of belts, and sprockets in place of pulleys are used in a chain transmission mechanism for rotating propellers in the directions reverse to each other.

Although the belt transmission mechanism is mainly described by way of example in the following specification, the belt and the pulley will be understood to mean a chain and a sprocket respectively unless otherwise specified.

In the counter propeller propulsion unit according to the invention, two belts (the forward and reverse running belts) or two chains and corresponding pulleys or sprockets are so structured as to be used to transmit the rotating force of the prime mover to the propellers.

According to a first aspect of the invention, the rotating force produced by the prime mover is transmitted via the forward running belt from the power pulley secured to the driving shaft. Then the forward propeller secured to the forward pulley is rotated in the same direction of rotation of the driving shaft.

On the other hand, the rotating force is transmitted to the reverse pulley as the power pulley secured to the driving shaft is interlocked with the outer side of the reverse running belt and then transmitted to the counter propeller from the reverse pulley via the main shaft, so that the counter propeller is rotated in the direction opposite to that of the driving shaft.

According to a second aspect of the invention, the rotating force produced by the prime mover is transmitted from the power pulley secured to the driving shaft via the reverse running belt to the reverse pulley. The rotating force is then transmitted to the forward pulley via the forward running belt, thus causing the forward propeller secured to the forward pulley to rotate in the direction opposite to the direction of rotating the driving shaft. Further, the rotating force of the reverse pulley is transmitted via the main shaft to the counter propeller so as to rotate the counter propeller in the same direction as that of the driving shaft.

As stated above, two rows of propellers having a common axis are rotated in the directions reverse to each other while canceling a defect due to the synchronous property of the single row propeller, that is, canceling counter torque causing the moving body to make a roll in one direction and moreover the gyro-effect of bringing about deflection from its progressing direction is neutralized; this results in decreasing the swinging of the aircraft on one side when it takes off. Even when a sudden increase or decrease in the engine output occurs, the aircraft operability still remains improvable without any Dutch roll.

Further, a belt is normally subjected to elastic deformation because of the difference in tension between its stretching and loosening sides and a change in its length functions as what is a so-called belt creep phenomenon in which the belt appears to slip on the surface of a pulley and this results in minimizing the load applied to an engine at the time it is started or suddenly accelerated, also making the engine easy to start or accelerate or preventing it from undergoing fatigue.

With the ribs on the surface of the belt that is brought into contact with the pulley and those to be mated with the respective grooves formed therein, the contact area therebetween is far greater than what is obtainable from a simple planar contact to ensure that the rotating force of the prime mover is transmitted to the propellers. In other words, the belts are prevented from laterally moving and also from being brought into contact with each other.

BEST MODE FOR CARRYING OUT THE INVENTION

The present invention will now be described by way of a preferred embodiment with reference to the drawings.

Figure 2:
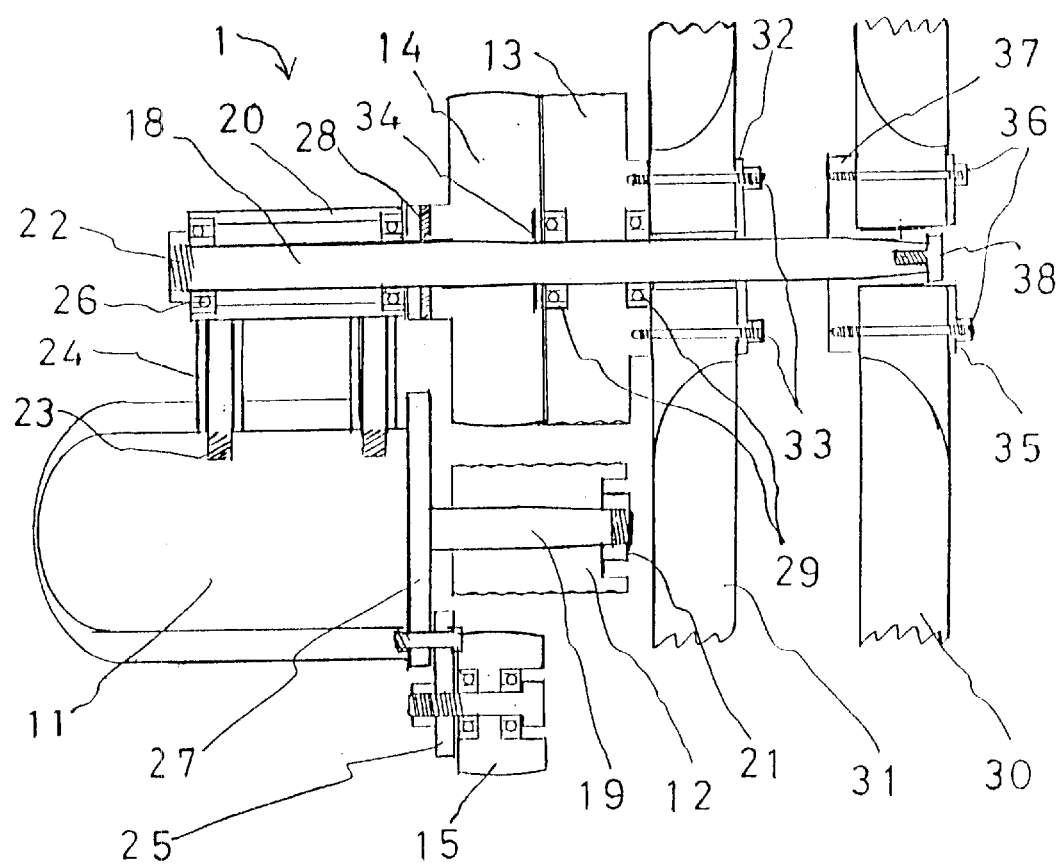
FIG. 2 is a sectional view of the principal part of a counter propeller propulsion unit.

In the embodiment of the invention shown in FIG. 2, a 1–2 cylinder gasoline (mixed oil) engine for a motorcycle is used as a prime mover 11. A driving shaft 19 so formed as to be tapered toward its front end is provided to the front of the prime mover 11, and a power pulley 12 is fixed to the driving shaft 19 with a power pulley fixing nut 21. There may be provided forward and reverse power pulleys 12 separately. In a chain transmission mechanism exist forward and reverse power sprockets (not shown) that are separately secured to the driving shaft 19. Further, a tension regulating plate 25 capable of adjusting the position of a tension pulley 15 pivotally fitted to the shaft is fixed with a screw to the lower portion of the driving shaft 19 in the front cover portion 27 of the prime mover 11. The prime mover 11 is not limited to the aforementioned but may be a multi-cylinder engine, a diesel engine, an electric motor or the like.

On the other hand, a main shaft 18 is pivoted rotatably on a supporting body 20 with angular ball bearings 26, for example, and fixedly clamped with a main shaft fixing nut 22 in the rear end portion of the main shaft; this arrangement prevents the bearings 26 from being separated from the main shaft and also prevents the main shaft from moving longitudinally and keeps it in a stable condition. The supporting body 20 is fixed to the upper portion of the prime mover cover with supporting body fixing screws 23 respectively passing through supporting body supports 24. The main shaft is tapered in such a manner that it becomes slightly thinner in the front portion of the supporting body 20. A reverse pulley 14 having a tapered hole mating with the main shaft portion is pressed against the tapered main shaft portion and fixed with a reverse pulley fixing screw 28.

A forward pulley 13 is pivoted on the-main shaft via forward pulley pivoting bearings 29 in front of the reverse pulley 14. A forward propeller 31 and a forward propeller fitting washer 32 are secured to the forward pulley 13 in this order with forward pulley fitting lock nuts 33. A thrust bearing 34 is provided between the reverse pulley 14 and the forward pulley 13 so that the reverse movements of these pulleys may be maintained smoothly. Although the forward propeller 31 and the washer 32 are fitted to the forward pulley 13 in such a manner that they are idly movably fitted to the main shaft, they are subjected to backward pressure with respect to the main shaft because of the reaction of the torque generated by the rotation of the forward propeller 31, whereby the forward propeller 31 is never moved forward during the operation.

A flange 37 for fitting a counter propeller 30 with counter propeller fitting lock nuts 36 via counter propeller fitting washers 35 is secured to the main shaft in front of the forward propeller 31. In order to secure the flange 37 to the main shaft, the tapered front end portion of the main shaft is fitted into the tapered hole of the flange 37 as in the case of fitting the reverse pulley 14 to the main shaft and then a flange fixing screw 38 is put into the front end portion of the main shaft for fixing purposes.

Subsequently as exemplarily shown in FIG. 1 and 3, a forward running belt 16 is used to interlock the power pulley 12 with the forward pulley 13 whereby to transmit rotating force in the same direction of that of the power pulley 12 via the forward running belt 16 to the forward pulley 13. On the other hand, a reverse running belt 17 is used to interlock the reverse pulley 14 with the tension pulley 15 so as to force the right-hand outside 39 of the reverse running belt 17 to contact the power pulley 12 whereby to transmit rotating force reverse to that of power pulley 12 to the reverse pulley 14 via the reverse running belt. In addition to the above transmission means, the reverse running belt shown by the broken line of FIG. 1 may also be used for interlocking the left-hand outside 40 with the power pulley 12 according to the invention.

Figure 1:
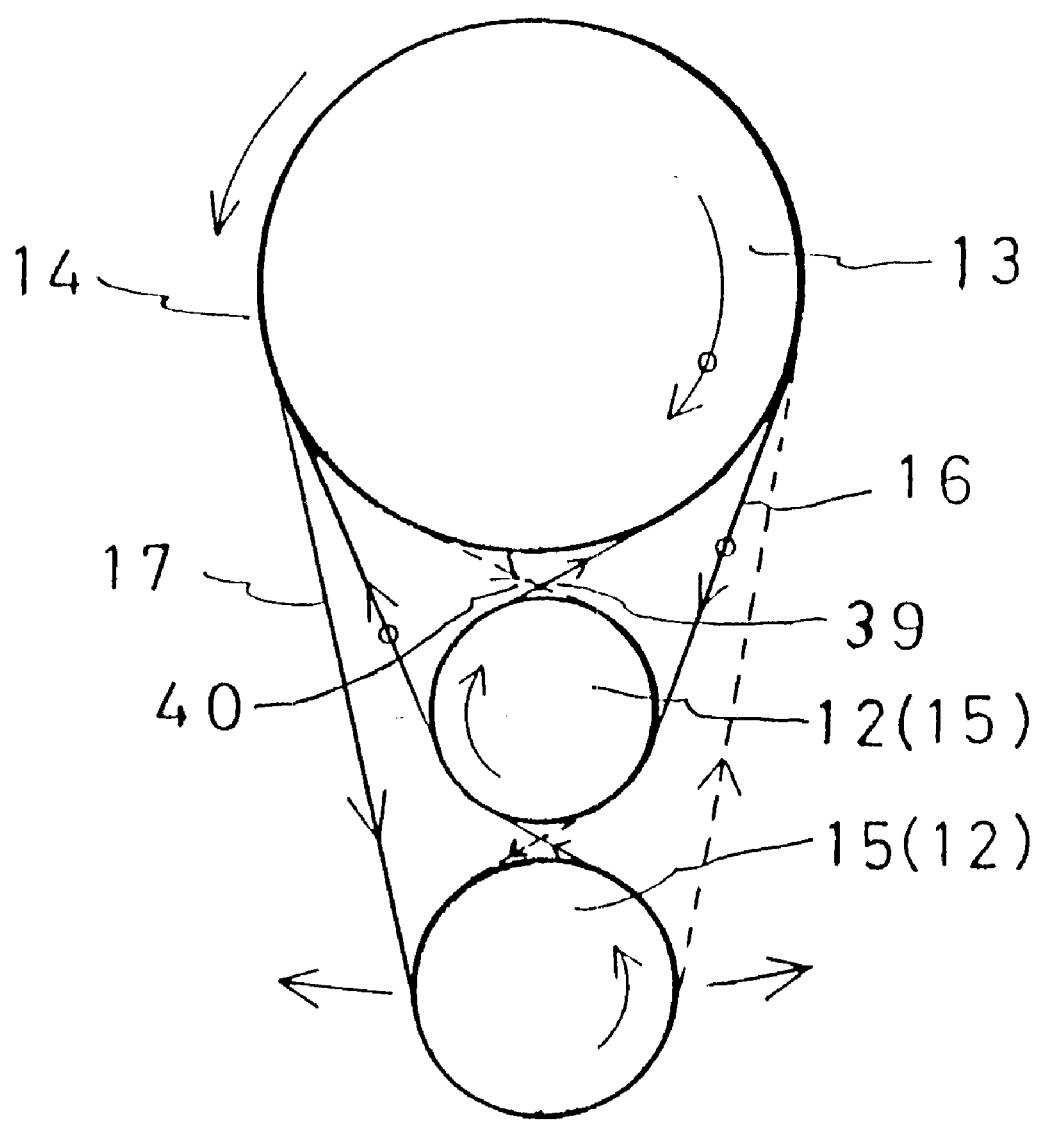
FIG. 1 is a block diagram of a rotating force transmission mechanism.
Figure 3:
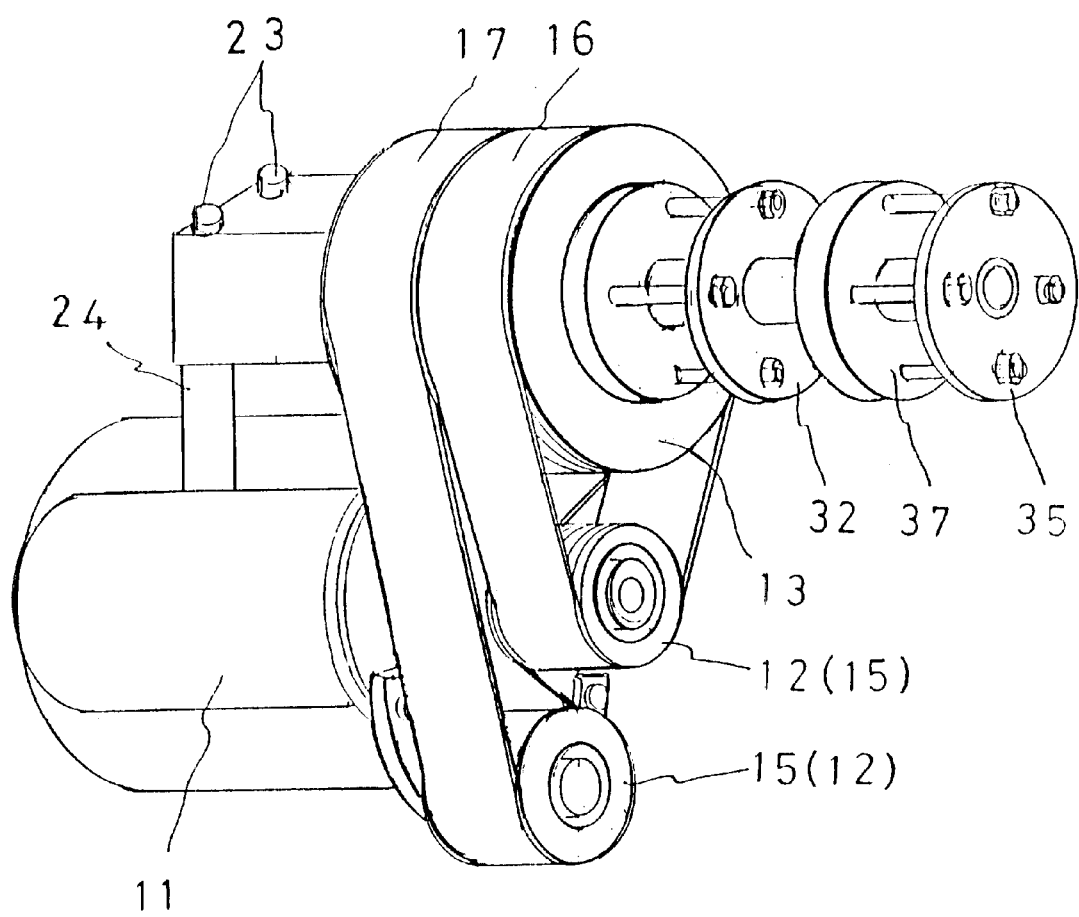
FIG. 3 is a perspective view of the principal part of the counter propeller propulsion unit.

In a second embodiment of the invention, as exemplified with parentheses (15) in place of 12, or (12) in place of 15 in FIGS. 1 and 3, the relation between the power pulley secured to the driving shaft and the tension pulley pivotally provided to the tension regulating plate is reversed, so that the relation between the rotational directions of the driving shaft and the propellers is also reversed. Therefore, the rotational direction must be reversed in order to apply the propulsion in the first embodiment of the invention to that in the second embodiment thereof.

The tensile strength of the reverse running belt 17 is held by swinging the tension pulley 15 in the lateral direction of the tension regulating plate 25 and fixing the tension pulley 15 to the tension regulating plate 25 in a proper tensile strength position of the belt. The tensile strength of the forward running belt 16 is regulated by adjusting the height of the supporting body supports 24. Further, the pulley-to-pulley diameter ratio interlocked with the belts is determined by the number of propeller rotations and normally set identical so that the number of forward and reverse rotations of propellers may be the same.

The aforementioned belts are made of fur, woven fabric, rubber, link, steel plate or any combination of them.

Particularly, it is preferred to provide rubber belts formed with fabric with laminated rubber, for example, synthetic rubber such as polybutadien rubber, SBR, EPDM or the like or natural rubber having excellent anti-gasoline properties or any combination of them in view of excellent durability, suitable flexibility and frictional wear.

Figure 6:
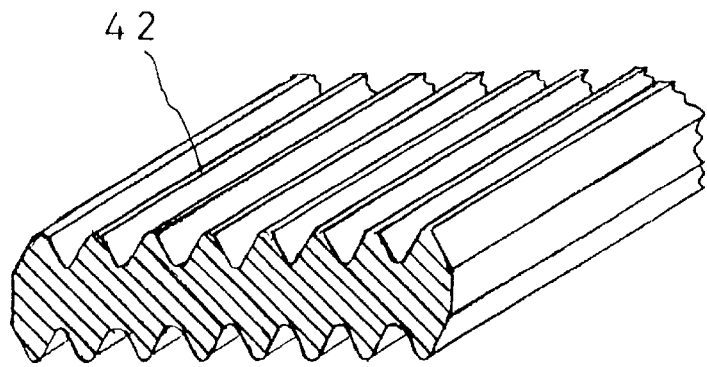
FIG. 6 is a partial perspective view of a belt having inverted-V ribs on both sides.

In a third embodiment of the invention, there is shown an example of using a belt having inverted-V ribs 42 on both sides as shown in FIG. 6. The use of such a belt as the reverse running belt 17 in combination with the pulley having a proper groove mating with each rib is preferred because this ensures the transmission of the rotating force and the prevention of sideslipping. Moreover, a belt having inverted-V ribs on its one side may be employed as the forward running belt 16.

In a case where a combination of the planar reverse running belt 17 with the planar pulley is used and where a combination of the forward running belt 16 having inverted-V ribs on its one side with the grooved pulley is used, the number of rotations of the forward pulley may slightly differ from the number of rotations of the reverse pulley because of difference in the load center where both the belts and pulleys meet; to correct that difference, the number of rotations of the former should preferably be made to match that of the latter by setting the outer diameter of the reverse pulley 14 slightly greater than that of the forward pulley 13.

Figure 5:
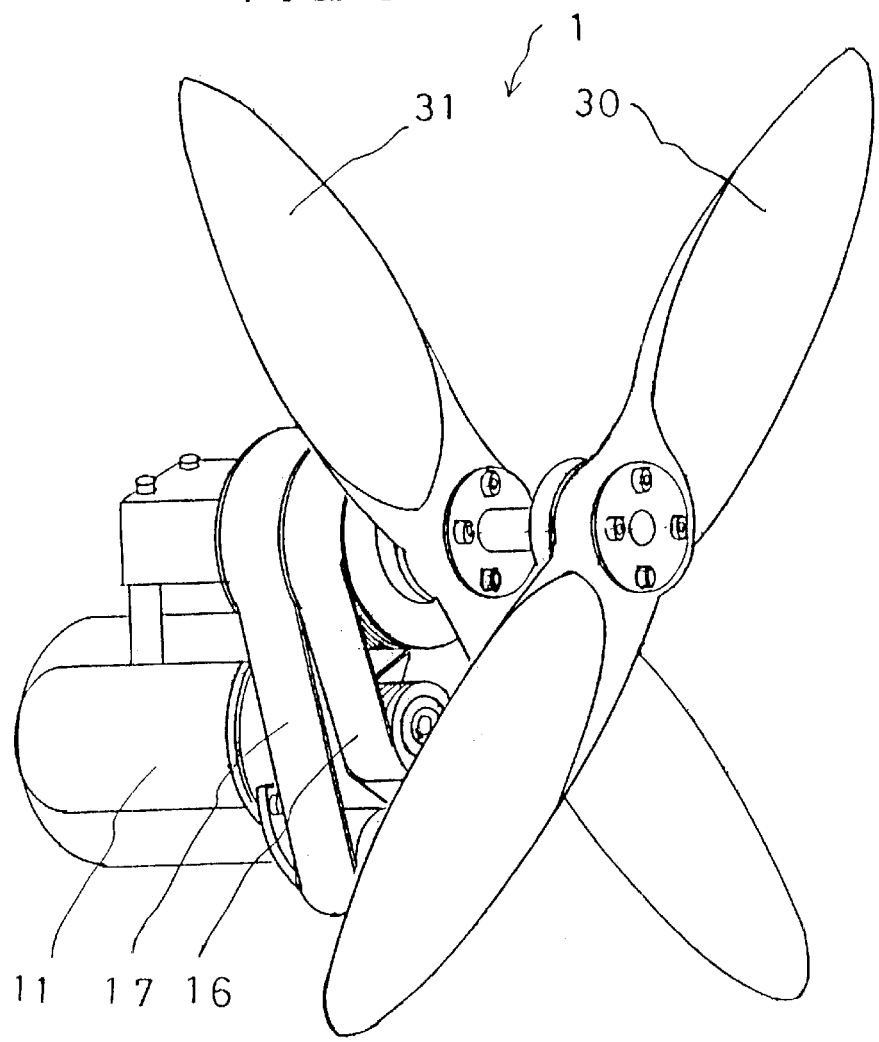
FIG. 5 is a perspective view of the overall counter propeller propulsion unit.

The propellers in the embodiments 1 and 2 of the invention include as shown in FIG. 5 the forward and counter propellers fitted to the main shaft, each having two symmetric blade faces twisted in the same direction.

Both the forward and counter propellers are rotated in the directions reverse to each other and act as tractors or pushers with respect to the airframe.

The propellers according to the invention may be made of any material including, but not limited to, wood, lightweight metal and alloy such as aluminum and Duralumin, glass fiber (FRP), and any combination of these. Members other than the propellers for use in the embodiments of the invention may also be made of any material as long as its strength, weight and the like are applicable to the invention.

Figure 4:
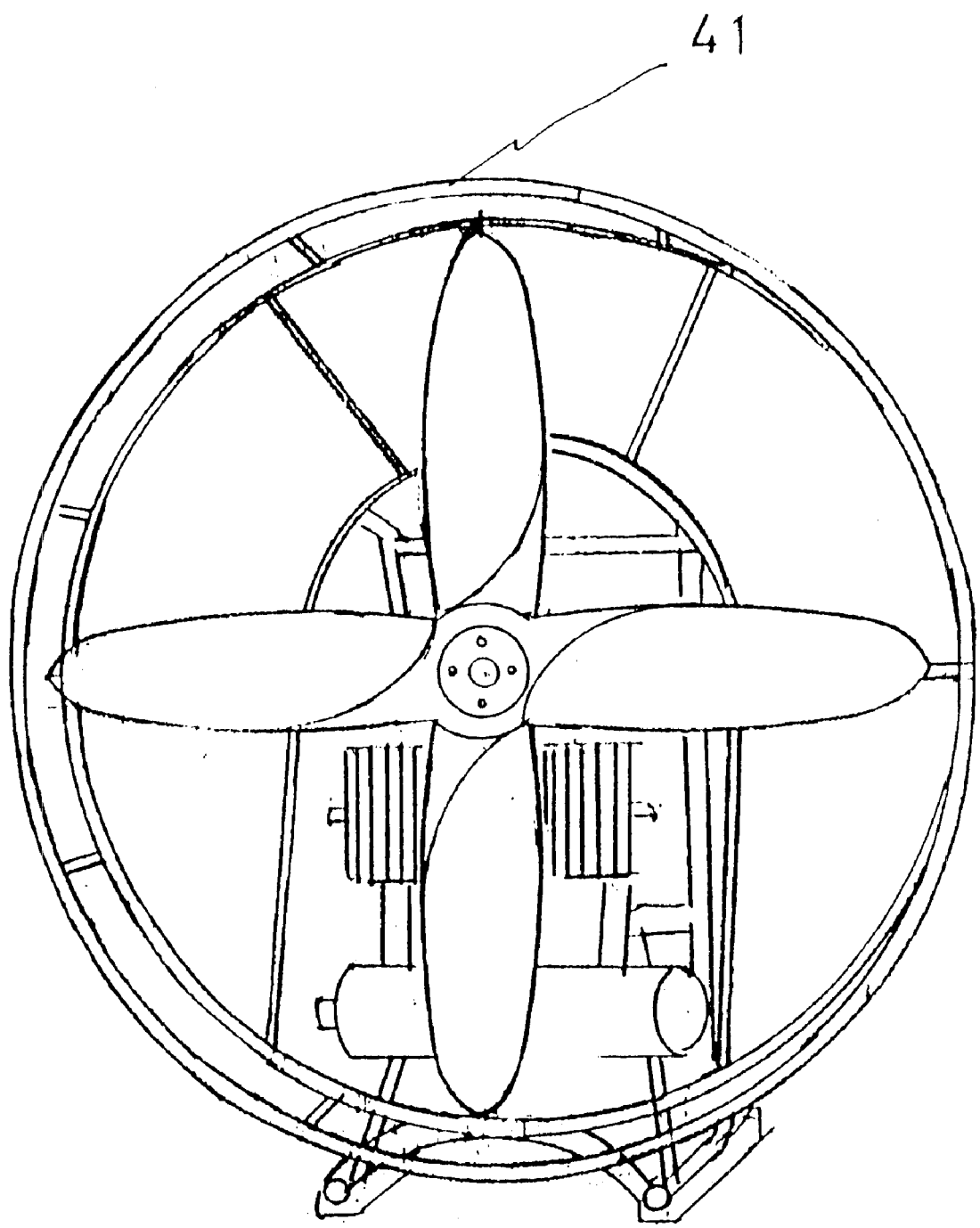
FIG. 4 is a perspective view of the counter propeller propulsion unit fitted to a paraglider.

As shown in FIG. 4, the counter propeller propulsion unit according to the invention is mounted in the rear of a motor paraglider to drive the airframe forward, whereas in the case of a light plane, a helicopter or the like, such a counter propeller propulsion unit is normally employed as what produces a forward thrust.

In addition to two of the linear blades used in the first embodiment of the invention, use can be made of more than two to six blades for the propeller. In this case, two rows of propellers as forward and counter propellers should preferably have the same number of blades; instead, a plurality of rows of propellers, such as four to six rows of propellers as forward and counter propellers in combination according to this embodiment of the invention may be employed.

Representative examples will now be described.

EXAMPLE 1

As exemplarily shown in FIG. 4, the counter propeller propulsion unit according to the first embodiment of the invention was mounted in the rear of a paraglider with propellers directed backward and a Duralumin safety net 41 was stretched on the boundary therebetween. In this example, there were used, as described in the second embodiment of the invention, the reverse running belt having the inverted-V ribs on both its sides, the forward running belt having the inverted-V ribs on its one side, and the pulleys respectively having the sectionally V-shaped grooves.

EXAMPLE 2

This example was the same as the example 1 except that chains and sprockets in place of belts and pulleys were respectively employed. Steel chains and steel sprockets for use in bicycles and motorcycles were applied to this example. Other than steel materials, lightweight ones made of aluminum, Duralumin, plastics or a combination of these may needless to say be usable.

Comparative Example

In place of the counter propeller propulsion unit according to the first embodiment of the invention, an ordinary single row propeller having two blades together with flat belts and pulleys without grooves was employed.

Test Results

Tests using paragliders equipped with the aforementioned embodiments 1 and 2 and the comparative example were made by three testers one after another.

The test results showed that the paragliders with the counter propeller propulsion units according to the embodiments 1 and 2 of the invention were free from any rolling sideways even though the engine outputs were increased or decreased suddenly. Moreover, the paragliders showed excellent stability, steerability and safety to ensure that even beginners were able to operate the paragliders with ease. On the contrary, the paraglider as the comparative example was subjected to rolling sideways when it took off or when its engine was increased or decreased suddenly. Moreover, the comparative example appeared to need excessive force to recover its normal posture, thus tending to panic the beginner. In the case of engines with the same horsepower, the force of the counter propeller propulsion units according to the embodiments of the invention can be made greater by about 50% (bodily sensation) than the comparative example. In other words, the number of rotations of the engine or the horsepower is decreasable to that degree. The above test results are unanimously agreed upon by the testers.

Since the counter propeller propulsion unit according to the invention is thus structured and can dispense with gear boxes that constitute the greater part of the weight of the geared transmission means, the counter propeller propulsion unit is made by far lightweight, whereby it is allowed to be mounted in any lightweight moving body that has been considered unmountable therewith.

The counter propeller propulsion unit according to the invention demonstrates to provide such a lightweight moving body as is subjected to the torque reaction and the gyro effect with excellent steerability and prevention of noise by decreasing the sound produced by propellers. As it is also possible to reduce weight and improve propulsion efficiency while material as well as fuel is saved, global warming prevention will become achievable. Further, the provision of the power transmission mechanism which is simple in structure, makes unnecessary the supply of a lubricant to gears, renders troubleshooting and maintenance easy, and is capable of enabling the predicting of any trouble to ensure a stabilized and safe operation.

What is claimed is:

1. A counter propeller propulsion unit comprising:
   a prime mover;
   a drive shaft connected to and rotatable by said prime mover;

a power pulley secured to said drive shaft so as to be rotatable in a forward rotation direction by said prime mover;

a supporting body;

a main shaft having first and second ends, wherein said first end is rotatably supported by said supporting body;

a reverse pulley secured to said main shaft;

a forward pulley rotatably fitted to said main shaft and said reverse pulley via bearings;

a forward propeller connected to said forward pulley;

a flange secured to said main shaft at or near said second end of said main shaft;

a counter propeller secured to said flange;

a forward-running belt contacting said forward pulley and said power pulley so as to interlock said forward pulley and said power pulley, such that said forward pulley and said forward propeller are rotatable in a forward rotation direction by said forward-running belt and said power pulley;

a tension pulley;

a reverse-running belt contacting said reverse pulley and said tension pulley on an inside of said reverse-running belt, and contacting said power pulley on an outside of said reverse-running belt so as to interlock said reverse pulley and said power pulley such that said reverse pulley, said main shaft, said flange, and said counter propeller are rotatable in a counter rotation direction that is opposite to the forward rotation direction, wherein said forward propeller and said counter propeller are rotated in opposite directions.

2. A counter propeller propulsion unit according to claim 1, wherein said drive shaft is located outside a circumference of said forward pulley and/or said reverse pulley.

3. A counter propeller propulsion unit according to claim 1, wherein axes of said drive shaft and said main shaft are different from each other.

4. A counter propeller propulsion unit according to claim 1, wherein at least one of said forward-running belt and said reverse-running belt has a plurality of substantially inverted-V ribs running in a longer direction of the belt on a side or sides of the belt that contact a pulley, and at least one of said power pulley, forward pulley, reverse pulley, and tension pulley has substantially sectionally V-shaped grooves in a circumferential direction for engaging with said ribs.

5. A counter propeller propulsion unit comprising:

a prime mover;

a drive shaft connected to and rotatable by said prime mover;

a power pulley secured to said drive shaft so as to be rotatable in a first direction of rotation by said prime mover;

a supporting body;

a main shaft having first and second ends, wherein said first end is rotatably supported by said supporting body;

a first-direction pulley secured to said main shaft;

a second-direction pulley rotatably fitted to said main shaft and said first-direction pulley via bearings;

a second-direction propeller connected to said second-direction pulley;

a flange secured to said main shaft at or near said second end of said main shaft;

a first-direction propeller secured to said flange;

a tension pulley;

a first-direction-running belt contacting said first-direction pulley and said power pulley on an inside of said first-direction-running belt, and contacting said tension pulley on an outside of said first-direction-running belt so as to interlock said first-direction pulley and said power pulley such that said first-direction pulley, said main shaft, said flange, and said first-direction propeller are rotatable in the first-direction, and such that said tension pulley is rotatable in a second direction of rotation that is opposite to the first direction of rotation;

a second-direction-running belt contacting said second-direction pulley and said tension pulley so as to interlock said second-direction pulley and said tension pulley, such that said second-direction pulley and said second-direction propeller are rotatable in the second direction by said second-direction-running belt and said tension pulley, wherein said first-direction propeller and said second-direction propeller are rotated in opposite directions.

6. A counter propeller propulsion unit according to claim 5, wherein said drive shaft is located outside a circumference of said first-direction pulley and/or said second-direction pulley.

7. A counter propeller propulsion unit according to claim 5, wherein axes of said drive shaft and said main shaft are different from each other.

8. A counter propeller propulsion unit according to claim 5, wherein at least one of said first-direction-running belt and said second-direction-running belt has a plurality of substantially inverted-V ribs running in a longer direction of the belt on a side or sides of the belt that contact a pulley, and at least one of said power pulley, first-direction pulley, second-direction pulley, and tension pulley has substantially sectionally V-shaped grooves in a circumferential direction for engaging with said ribs.

9. A counter propeller propulsion unit comprising:

a prime mover;

a drive shaft connected to and rotatable by said prime mover;

a power sprocket secured to said drive shaft so as to be rotatable in a forward rotation direction by said prime mover;

a supporting body;

a main shaft having first and second ends, wherein said first end is rotatably supported by said supporting body;

a reverse sprocket secured to said main shaft;

a forward sprocket rotatably fitted to said main shaft and said reverse sprocket via bearings;

a forward propeller connected to said forward sprocket;

a flange secured to said main shaft at or near said second end of said main shaft;

a counter propeller secured to said flange;

a forward-running chain contacting said forward sprocket and said power sprocket so as to interlock said forward sprocket and said power sprocket, such that said forward sprocket and said forward propeller are rotatable in a forward rotation direction by said forward-running chain and said power sprocket;

a tension sprocket;

a reverse-running chain contacting said reverse sprocket and said tension sprocket on an inside of said reverse-running chain, and contacting said power sprocket on an outside of said reverse-running chain so as to interlock said reverse sprocket and said power sprocket such that said reverse sprocket, said main shaft, said flange, and said counter propeller are rotatable in a counter rotation direction that is opposite to the forward rotation direction, wherein said forward propeller and said counter propeller are rotated in opposite directions.

10. A counter propeller propulsion unit according to claim 9, wherein said drive shaft is located outside a circumference of said forward sprocket and/or said reverse sprocket.

11. A counter propeller propulsion unit according to claim 9, wherein axes of said drive shaft and said main shaft are different from each other.

12. A counter propeller propulsion unit comprising:

a prime mover;

a drive shaft connected to and rotatable by said prime mover;

a power sprocket secured to said drive shaft so as to be rotatable in a first direction of rotation by said prime mover;

a supporting body;

a main shaft having first and second ends, wherein said first end is rotatably supported by said supporting body;

a first-direction sprocket secured to said main shaft;

a second-direction sprocket rotatably fitted to said main shaft and said first-direction sprocket via bearings;

a second-direction propeller connected to said second-direction sprocket;

a flange secured to said main shaft at or near said second end of said main shaft;

a first-direction propeller secured to said flange;

a tension sprocket;

a first-direction-running chain contacting said first-direction sprocket and said power sprocket on an inside of said first-direction-running chain, and contacting said tension sprocket on an outside of said first-direction-running chain so as to interlock said first-direction sprocket and said power sprocket such that said first-direction sprocket, said main shaft, said flange, and said first-direction propeller are rotatable in the first-direction, and such that said tension sprocket is rotatable in a second direction of rotation that is opposite to the first direction of rotation;

a second-direction-running chain contacting said second-direction sprocket and said tension sprocket so as to interlock said second-direction sprocket and said tension sprocket, such that said second-direction sprocket and said second-direction propeller are rotatable in the second direction by said second-direction-running chain and said tension sprocket, wherein said first-direction propeller and said second-direction propeller are rotated in opposite directions.

* * * * *